J. CARROLL.
RAKE.
APPLICATION FILED NOV. 3, 1913.
1,123,682.
Patented Jan. 5, 1915.
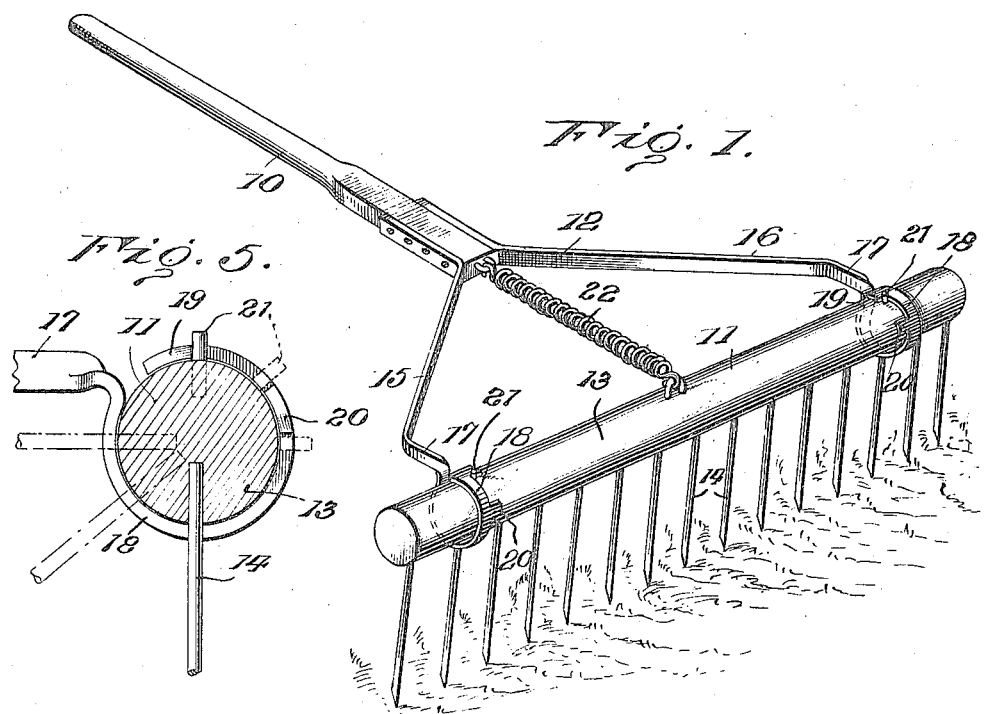
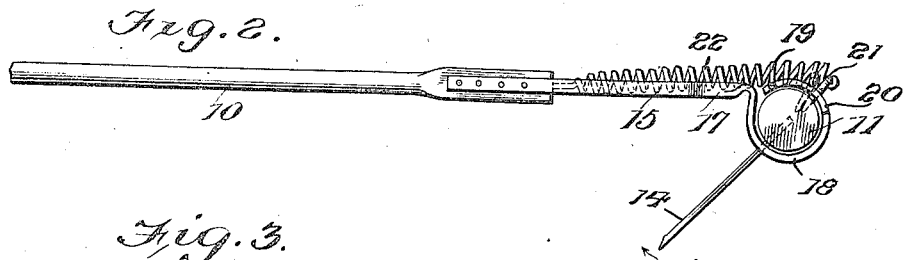
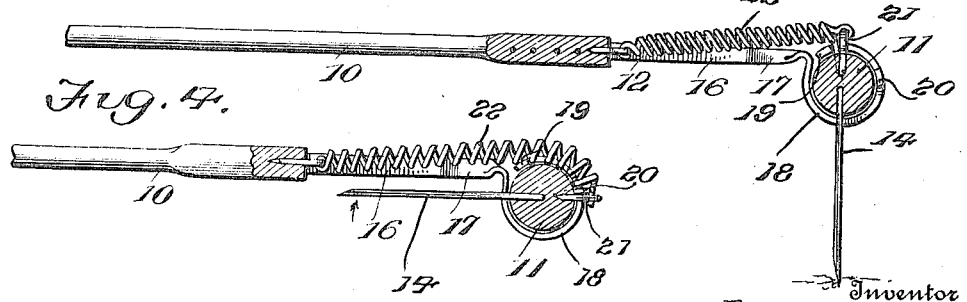
Inventor
James Carroll.
Witnesses
By
Attorneys

UNITED STATES PATENT OFFICE.

JAMES CARROLL, OF PITTSFIELD, ILLINOIS.

RAKE.

1,123,682.  Specification of Letters Patent.  Patented Jan. 5, 1915.

Application filed November 3, 1913. Serial No. 798,983.

*To all whom it may concern:*

Be it known that I, JAMES CARROLL, citizen of the United States, residing at Pittsfield, in the county of Pike and State of Illinois, have invented certain new and useful Improvements in Rakes, of which the following is a specification.

My invention relates to improvements in hand rakes, the primary object of my invention being the provision of a hand rake which will be self-cleaning.

A further object of my invention is to so construct the rake that waste matter may be freed and removed from the rake teeth while employing the rake in the usual manner, this construction being such as to avoid the necessity of employing individual spring fingers operating between the teeth to clean the same, sliding tooth cleaner members or other cleaning structures of similar nature which considerably increases the cost of rake manufacture and also the weight of the rake.

A still further object of my invention is to mount the rake head upon its handle in such a manner that it will operate in the usual manner when drawn toward the person employing the rake, while when pushed along the ground away from the operator, the rake head will tilt to bring its teeth parallel with the ground and thus permit wiping off or removal of all foreign matter therefrom.

A still further object of my invention is the provision of means for normally holding the rake head with its teeth perpendicular to the plane of the rake handle and tooth bar of the rake.

A still further object of my invention is the provision of a self-cleaning rake in which the rake head may be swung to bring its teeth into a plane parallel with the rake handle to permit convenient packing or storing of the rake, the head, when in this position, being locked against swinging movement.

With these and other objects in view, my invention will be more fully described, illustrated in the accompanying drawing, and then specifically pointed out in the claims which are attached to and form a part of this application.

In the drawings: Figure 1 is a perspective view of my improved rake, a portion of the handle being broken away to permit the showing of the rake construction upon a larger scale than would otherwise be possible; Fig. 2 is a side elevation of the rake, showing the relative inclination occupied by the teeth with respect to the handle during cleaning of the rake; Fig. 3 is a longitudinal sectional view, showing the normal position of the teeth; Fig. 4 is a detail view of the rake with the rake head swung to bring the teeth in parallel relation to the rake handle. Fig. 5 is a sectional view on an enlarged scale, showing the rake head in normal position in full lines and in its other position in dot and dash lines.

Corresponding and like parts are referred to in the following description and indicated in all the views of the drawing by the same reference characters.

The preferred embodiment of my invention includes a rake handle 10, a rake head, indicated as a whole by the numeral 11 and a bow or yoke 12 connecting the handle and head. The rake head includes a tooth bar 13, which may be of any desired type, and to which are secured in any suitable manner, a plurality of spaced rake teeth 14. This tooth bar 13 is preferably circular in cross section and if otherwise shaped is provided adjacent its ends with circular bearing portions.

The bow or yoke connecting the handle and rake head may be secured to the handle in any suitable manner and includes a pair of resilient arms 15 and 16 which diverge or are bowed from each other from the end of the handle, the arms adjacent their terminals being inbent to extend parallel with the handle as shown at 17. The terminals of the arms are then bent to provide circular loops or sleeves 18 to embrace the tooth bar 13 of the rake head, the tooth bar thereby being free for turning movement in the sleeves to bring its teeth into various angular positions with respect to the plane of the rake handle and yoke. The arms 15 and 16 are formed of resilient material in order that their terminals may be free to move toward and away from each other to a slight extent for a reason which will be hereinafter explained.

It will of course be clear that in order to render the above described rake operative, it is necessary to provide means for limiting the turning of the tooth bar in the yoke sleeves. For this reason, each of the sleeves is provided at its inner edge with a pair of suitably spaced, inwardly directed extensions or lugs 19 and 20. The tooth bar 13 of the rake head is provided with pins 21 which normally bear against the inner edges of the sleeves 18 between the lugs 19 and 20. It will therefore be clear that under normal conditions, the extent to which the rake head may swing is limited by the movement of the pins between the stop lugs 19 and 20. The lugs 19 are so disposed that when the pins bear against them, the rake teeth 14 will extend in a plane at right angles to that of the handle and yoke. On the other hand, the lugs 20 are so disposed that when the pins bear against them and the rake is held in the usual manner, with the handle at an inclination to the ground, the rake teeth will extend in substantially parallel relation to the ground, or in such a manner that the rake head will rest flatly upon the ground.

Because of the resiliency of the arms 15 and 16, the said arms may be swung away from each other to free the sleeves 18 from the pins 21 after which the rake head may be further turned to bring the teeth 14 into a plane parallel with the handle. By then releasing the yoke arms, the sleeves will be brought back into engagement with the stop pins 21. The lugs 20 are of such extent that in this position the stop pins will engage against the opposite sides of the lugs from those against which they engage when the rake head is swung into parallel relation to the ground.

A helical spring 22 of suitable strength is secured by one end to the lower end of the handle 10 and extends in substantial alinement with the handle, being secured by its opposite end to what is the upper portion of the tooth bar 13 when the teeth carried by said bar are in operative position. It will therefore be seen that this spring will normally hold the rake head with the pins 21 in engagement with the lugs 19 and therefore with its rake teeth at right angles to the plane of the rake handle and yoke. However, when the rake head is swung to bring its teeth into a plane parallel to the plane of the rake handle and yoke, the spring will then act to hold the pins against the outer faces of the lugs 20 and prevent any further swinging of the rake head which might cause damage to the teeth by engagement with the yoke. In this latter position, therefore, the rake head will be held against swinging movement in one direction by the spring and in the reverse direction by the lugs 20.

The rake is employed in the same manner as the ordinary hand rake, being moved toward and away from the operator, the rake head always resting by its teeth upon the ground during movement toward the operator to draw toward him the loose leaves, grass or other matter being raked up.

Upon movement of the rake away from the operator, the rake head is customarily raised above the ground in order to avoid pushing any of the waste matter to be gathered in at the next movement of the rake, away from the operator. If however, the teeth become clogged with the waste matter being raked up, the rake head may be held in engagement with the ground during the earlier part of the movement of the rake away from the operator. This engagement of the rake head with the ground will cause the rake head to turn against the action of the spring 22 until stopped from further movement by the engagement of the pins 21 against the lugs 20. In this position, the rake head will bear flatly upon the ground and all waste matter caught upon the teeth of the rake will be wiped off. As soon as the rake head is again raised from the ground, the spring will immediately return it to normal position.

If deemed desirable, the spring 22 may be omitted without materially affecting the operation of the rake as the forward throw of the rake head, during the advance movement of the rake, will naturally tend to swing the rake head to bring its teeth at right angles to the plane of the rake handle and yoke, that is, to normal position. The employment of the spring is, however, advised as it renders the action of the rake more positive and causes the teeth to be constantly held flatly against the ground upon movement of the rake head away from the operator irrespective of any slight variations in the angle at which the rake handle may be held with respect to the ground, thus insuring more effectual cleaning of the teeth.

The engagement of the pins 21 against the inner faces of the sleeves 18, at all times holds the rake head against longitudinal movement through said sleeves. It will of course be clear, however, that the pins may be positioned to engage against the outer edges of the sleeves and that in such a case the lugs 19 and 20 will be extended outwardly from such edges instead of in the manner shown in the drawing.

I do not wish in any way to limit myself to the specific details of construction, illustrated in the drawing and described in the specification, as various changes, within the scope of the appended claims, may be made at any time without in the slightest degree departing from the spirit of this invention.

Having thus described the invention, what is claimed as new is:

1. A rake including a handle, resilient diverging arms extending from one end of the handle, the free ends of said arms being bent to form sleeves, laterally directed spaced lugs extending from the inner edges of the sleeves, a tooth bar mounted for turning movement in the sleeves, teeth carried by the bar, and stop pins carried by the bar in position to engage the lugs.

2. A rake including a handle, resilient diverging arms extending from one end of the handle, the free ends of said arms being bent to form sleeves, laterally directed spaced lugs extending from the inner edges of the sleeves, a tooth bar mounted for turning movement in the sleeves, teeth carried by the bar, stop pins carried by the bar in position to engage the lugs, and a helical spring connecting the upper portion of the bar and adjacent end of the handle to normally hold the pins in engagement with one set of lugs.

3. A rake including a handle, resilient arms extending from one end of the handle and terminating in sleeves each having spaced stop lugs, a rake head including a tooth carrying bar journaled in said sleeves, a helical spring connecting the upper portion of the bar with the adjacent end of the handle, and stop pins carried by the bar and engaging the sleeves between the lugs in position to engage the lugs and limit the swinging movement of the rake head, one lug of each sleeve being proportioned to be engaged at one side by the stop pins when the teeth of the rake head extend at an acute angle to the axis of the handle and at the opposite side when the teeth extend parallel with the axis of the handle.

4. A rake including a handle, a rake head swingingly mounted at one end of the handle, means for normally holding the rake head with its teeth in a plane at right angles to the handle, said means permitting limited swinging movement of the rake head and said means being further arranged to lock the rake head with its teeth in a plane parallel to the handle.

5. A rake including a handle, a tooth supporting bar pivotally supported at one end of the handle, means for locking the supporting bar with its teeth in a plane parallel to the handle, and means operable upon release of the locking means for automatically turning the supporting bar to bring its teeth into a plane at right angles to the handle.

6. A rake including a handle, a tooth supporting bar pivotally supported at one end of the handle, means for locking the supporting bar with its teeth in a plane parallel to the handle, and means operable upon release of the locking means for automatically turning the supporting bar to bring its teeth into a plane at right angles to the handle, said means including a spring connecting the handle and tooth bar.

7. A rake including a handle, a tooth supporting bar pivotally supported at one end of the handle, means for locking the supporting bar with its teeth in a plane parallel to the handle, and means operable upon release of the locking means for automatically turning the supporting bar to bring its teeth into a plane at right angles to the handle, said means including a spring connecting the handle and tooth bar, and stops for limiting the turning movement of the tooth bar.

In testimony whereof I affix my signature in presence of two witnesses.

JAMES CARROLL. [L. S.]

Witnesses:
 CHAS. M. HEISHEIMER,
 FRED W. GRAVES.